US006984409B2

(12) United States Patent
Gao et al.

(10) Patent No.: US 6,984,409 B2
(45) Date of Patent: Jan. 10, 2006

(54) SOY PROTEIN-CONTAINING IMITATION DAIRY COMPOSITIONS AND METHODS OF MAKING

(75) Inventors: Song Gao, Glenview, IL (US); Wen-Sherng Chen, Glenview, IL (US); Veronic M. Harrison, Bartlett, IL (US)

(73) Assignee: Kraft Foods Holdings, Inc., Northfield, IL (US)

( * ) Notice: Subject to any disclaimer, the term of this patent is extended or adjusted under 35 U.S.C. 154(b) by 94 days.

(21) Appl. No.: 10/818,830

(22) Filed: Apr. 6, 2004

(65) Prior Publication Data

US 2004/0191363 A1 Sep. 30, 2004

Related U.S. Application Data

(62) Division of application No. 10/217,338, filed on Aug. 12, 2002, now Pat. No. 6,780,446.

(51) Int. Cl.
*A23L 1/20* (2006.01)

(52) U.S. Cl. ......................... 426/634; 426/656; 426/46

(58) Field of Classification Search .................. 426/46, 426/634, 656

See application file for complete search history.

(56) References Cited

U.S. PATENT DOCUMENTS

| | | | | |
|---|---|---|---|---|
| 3,642,492 | A * | 2/1972 | Arndt | 426/583 |
| 4,132,808 | A * | 1/1979 | Kakade | 426/2 |
| 4,303,691 | A * | 12/1981 | Sand et al. | 426/573 |
| 4,349,576 | A * | 9/1982 | Lehnhardt et al. | 426/582 |
| 5,858,449 | A * | 1/1999 | Crank et al. | 426/656 |
| 2001/0024677 | A1 * | 9/2001 | Bringe | 426/656 |
| 2004/0037905 | A1 * | 2/2004 | Bringe | 424/757 |

* cited by examiner

*Primary Examiner*—Anthony Weier
(74) *Attorney, Agent, or Firm*—Fitch, Even, Tabin & Flannery

(57) ABSTRACT

This invention relates to use of soy protein to replace sodium caseinate or other dairy proteins in imitation dairy compositions. The invention relates to the imitation dairy compositions and methods of making such compositions. The stable, healthful and cost-effective composition is most desirably obtained when soy flour is treated prior to making the composition, either by heat treatment or protease treatment. This invention is especially directed to preparation of dips wherein a substantial amount, and preferably essentially all, dairy protein is replaced with soy protein.

12 Claims, 3 Drawing Sheets

SOY PROTEIN-CONTAINING IMITATION DAIRY COMPOSITIONS AND METHODS OF MAKING

This is a divisional of prior application Ser. No. 10/217,338, filed Aug. 12, 2002, now U.S. Pat. No. 6,780,446, which is hereby incorporated herein by reference in its entirety.

FIELD OF THE INVENTION

This invention relates to use of soy protein to replace a significant portion of sodium caseinate or other dairy proteins in imitation dairy compositions. The invention relates to the imitation dairy compositions and methods of making such compositions. The stable, healthful and cost-effective composition is most desirably obtained when soy flour is treated prior to making the composition, either by heat treatment or protease treatment. This invention is especially directed to preparation of dips wherein a substantial amount, and preferably essentially all, dairy protein is replaced with soy protein.

BACKGROUND OF THE INVENTION

The health benefits of soybeans have been known for some time. For centuries, soybeans have been the primary source of protein in Asian countries, and in recent years the popularity of soy-based products has increased in the U.S. Along with a tendency to lower cholesterol levels, soybeans have recently been linked with, or suggested as having a possible role in, inhibiting cancerous or tumor cells. Additionally, soy protein contains an amino acid profile that is among the most complete of all vegetable protein sources, and resembles, with the exception of the sulfur-containing amino acids, the pattern derived from high-quality animal protein sources. Thus, efforts have been made to incorporate soy into a wide variety of foods.

Examples of efforts to utilize soy proteins in salad dressings include U.S. Pat. No. 4,163,808 (use of soy proteins as the sole or dominant emulsifier); U.S. Pat. No. 4,304,795 (use of soybean protein in a semisolid egg yolk-free dressing); U.S. Pat. No. 4,426,395 (use of a partial hydrolyzate of alcohol denatured soybean protein as an emulsifier); U.S. Pat. No. 4,794,015 (use of a glycero phospholipid which contained at least about 40 percent mono acyl glycero phospholipid to prepare an oil-in-water emulsion of soy sauce and fat or oil); U.S. Pat. No. 4,431,629 (preparation of an egg white substitute from defatted soy bean material using proteolytic hydrolysis followed by ultrafiltration; the egg white substitute reported to have superior emulsifying ability, good nutritional value, and no bitter taste); and U.S. Pat. No. 4,757,007 (obtained hydrolyzed soy protein using a protease enzyme followed by a separation step to recover both low and high solubility hydrolyzed soy protein; the low solubility hydrolyzed soy protein was reported to have excellent emulsifying properties)

Examples of efforts to utilize soy proteins in cheese or cheese-like products include, for example, U.S. Pat. No. 4,080,477 (a process cheese-like product containing soy cheese); U.S. Pat. No. 4,284,656 (a curd product derived by water extraction of protein from a defatted soy bean followed by coagulation of the protein to form curds and whey; curd product can be mixed with or incorporated into cheese); U.S. Pat. No. 4,303,691 (stimulated cheese containing soy protein); U.S. Pat. Nos. 4,349,576 and 4,345,438 (vegetable protein isolates, including soy protein isolates, which can be incorporated into imitation cheese products); U.S. Pat. No. 4,556,569 (cheese analog product prepared from soy milk, vegetable oil, dairy whey, caseinate, and water); and U.S. Pat. No. 5,858,449 (isoflavone-enriched soy protein product which can be used as an ingredient in cheese products (as well as other food products)).

It would be desirable to provide other methods and compositions whereby the beneficial effects of soybeans can be incorporated into food products. It would also be desirable to provide methods and compositions whereby soy proteins can be used to replace sodium caseinate or other dairy proteins in imitation dairy compositions, including dips. The present invention provides such methods and compositions.

SUMMARY OF THE INVENTION

This invention relates to use of soy protein to replace a significant portion of sodium caseinate or other dairy proteins in imitation dairy compositions. The invention relates to the imitation dairy compositions and methods of making such compositions. The stable, healthful and cost-effective composition is most desirably obtained when soy flour is treated prior to making the composition, preferably either by heat treatment or protease treatment, in order to denature a substantial amount of the soy protein and carbohydrates (i.e., greater than about 40 and 50 percent, respectively) in the starting soy flour. This invention is especially directed to preparation of dips wherein a substantial amount (i.e., greater than about 50 percent, preferably greater than about 60 percent, and more preferably greater than about 70 percent) of dairy protein is replaced with soy protein. For purposes of this invention, a "substantial amount" of dairy protein is intended to also include cases where all the dairy protein is replace by soy protein.

The present application provides an imitation dairy composition and a method for making such an imitation dairy composition utilizing soy protein instead of, or in place of, conventional dairy proteins. In the present application, soy proteins, preferably in the form of soy flour, soy protein concentrate, or soy protein isolate, are used to make the imitation dairy composition. The imitation dairy composition disclosed herein are especially useful in preparing food products such as dips. Generally, the present soy-containing food products of this invention are as stable and as flavorful as conventional dairy food products; they are, however, less expensive and provide substantial health benefits to the consumer. Soy protein reportably can lower cholesterol, reduce the risk of heart diseases and cancer, reduce symptoms associated with menopause, and contribute to bone heath and longevity. The Food and Drug Administration has issued a Cardiac Vascular Disease (CVD) health claim for soy protein for its cholesterol-lowering ability. In addition, soy protein is also known to have emulsifier functionality. The use of soy protein, especially soy flour, to replace costly sodium caseinate in imitation dairy compositions, especially dips, can result in significant cost savings.

In one embodiment of the present application, the soy protein source is soy flour, which has been heat-treated prior to incorporation into the imitation dairy composition. The invention provides for dispersing the soy flour in water and heating it to a temperature of about 75 to about 100° C. (preferably to about 80 to about 85° C.) for a time sufficient to denature a substantial amount of the proteins and carbohydrates (i.e., at least about 40 percent and at least about 50 percent, respectively) contained therein (generally about 1 to about 15 minutes). The treated soy flour can be used in various food products. For example, to prepare a soy-containing dip, the soy flour is collected, blended with gum, salt, and water to make a dispersion. The resulting dispersion is heated; oil and emulsifiers are then added to make a pre-mix. The pre-mix is then heated, homogenized, and cooled to make the imitation dairy composition.

In another embodiment of the invention, the soy protein source is soy flour which has been protease-treated in order to hydrolyze the protein, followed by heat treatment to inactivate the enzyme and to denature a substantial amount of the proteins and carbohydrates (i.e., at least about 40 percent and at least about 50 percent, respectively) contained therein. The enzyme treatment will also enhance emulsion functionality and reduce the average molecular weight of the soy protein molecules. For example, an aqueous dispersion of soy flour is treated with a protease and then heated to inactivate the protease and denature a substantial amount of the proteins and carbohydrates. The treated soy flour can be used in various food products. For example, to prepare a soy-containing dip, the treated soy flour is blended with gum, salt, and water to make a dispersion. The resulting dispersion is heated; oil and emulsifiers are then added to make a pre-mix. The pre-mix is then heated, homogenized, and cooled to make the imitation dairy composition.

DETAILED DESCRIPTION OF THE INVENTION

Figure 1:
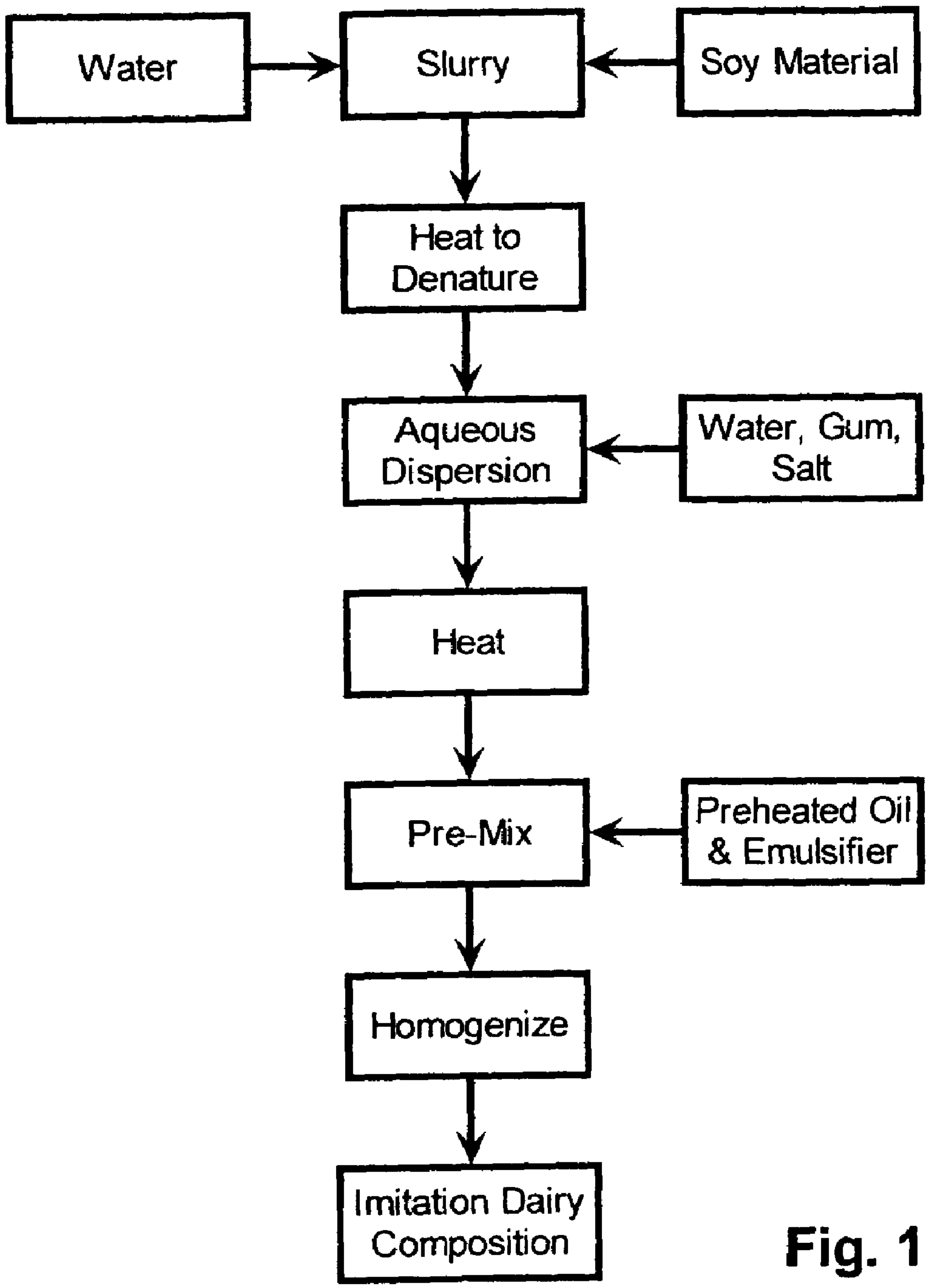
FIG. 1 is a flow chart generally illustrating the preparation of a soy protein-containing dip using the method of this invention whereby the proteins and carbohydrates are denatured using heat treatment.

This invention relates to an imitation dairy composition and a method for making such an imitation dairy composition utilizing treated soy protein to replace some (i.e., greater than about 50 percent, preferably greater than about 60 percent, and most preferably greater than about 70 percent) of the conventional dairy proteins. For purposes of this invention, a "substantial amount" of dairy protein is intended to also include cases where all the dairy protein is replace by soy protein. Although not wishing to limited by theory, it is believed that treated soy protein are responsible for providing stable emulsions and providing the health benefits normally associated with soy protein. The health benefits and cost savings of soy protein, and especially soy flour, find application in the preparation of the imitation dairy compositions and food products made therefrom, especially including dips.

For purposes of this invention, the term "soy protein" is intended to include soy flour, soy protein concentrate, soy protein isolate, powdered or dried soy milk, soy meal, and ground or whole soy beans. Preferably soy flours are used in the practice of the present invention. Generally suitable soy flours have protein dispersibility indexes of about 30 to about 85 percent, preferably about 40 to about 75 percent, and more preferably about 50 to about 70 percent. The soy flour is treated prior to incorporating it into the imitation dairy composition ("pre-treatment") in order to denature a substantial amount of the proteins and carbohydrates contained therein. In one embodiment of the invention, the "pre-treatment" comprises heating an aqueous slurry of soy flour to a temperature of about 75 to about 100° C. (preferably to about 80 to about 85° C.) for a time sufficient to denature a substantial amount of the proteins and carbohydrates (i.e., at least about 40 percent and at least about 50 percent, respectively) contained therein (generally about 1 to about 15 minutes), and then cooling the slurry. The pre-treated soy flour can then be incorporated into the imitation dairy composition of the invention.

In another embodiment of the invention, the selected soy flour is treated with protease, followed by heat treatment to inactivate the protease and to denature a substantial amount of the proteins and carbohydrates (i.e., at least about 40 percent and at least about 50 percent, respectively) contained therein, prior to incorporation of the soy flour into the imitation dairy composition. Suitable protease enzymes include, for example, bacterial proteases, fungal protease, microbial proteases, trypsin, chytrpsin, pepsin, and the like. Specific examples of preferred enzymes included Corolase 7089 and Corolase PN-L (AB Enzyme, Somerset, N.J.). After the protease treatment, the mixture is generally heated to about 80 to about 100° C. for about 3 to about 15 minutes to inactivate the enzyme and to denature the protein and carbohydrate contained therein.

The use of soy protein in the present invention is not only beneficial to the consumer's health, but is believed to be beneficial in the manufacturing of the diary composition disclosed herein. Sodium caseinate normally found in conventional dips is relatively costly. Replacing a significant amount of sodium caseinate with treated soy protein in the manufacture of dips or other imitation dairy products provides a significant cost savings. The reduced caseinate dips (i.e., greater than about 50 percent, preferably greater than about 60 percent, most preferably greater than about 70 percent, and most preferably essentially all of the sodium caseinate has been replaced by treated soy protein) or non-caseinate dips (i.e., all of the sodium caseinate has been replaced by treated soy protein) have flavor, texture, and appearance similar to conventional dips. For purposes of this invention, "reduced caseinate dips" are intended to include the non-caseinate dips wherein all of the sodium caseinate has been replaced by treated soy protein.

Conventional dips are oil-in-water (O/W) emulsions in which sodium caseinate and whey protein concentrate are the protein emulsifiers. Some of these proteins are adsorbed at the O/W interface while the remaining portion of the proteins forms the gel network in the continuous phase. Emulsion droplets as well as spices are embedded in the protein/gum/starch gel matrixes. The treated soy protein of the present invention can also function as emulsifier in dip products. In fact, protein immuo-labeling and transmission electron microscopic (TEM) analysis of soy protein-containing dip product of this invention indicates that soy protein predominantly surrounds the oil droplets while sodium caseinate is predominantly situated in the gel matrix. Thus, it appears that the treated soy protein is at least as good, if not better, as an emulsifier that sodium caseinate.

Figure 2:
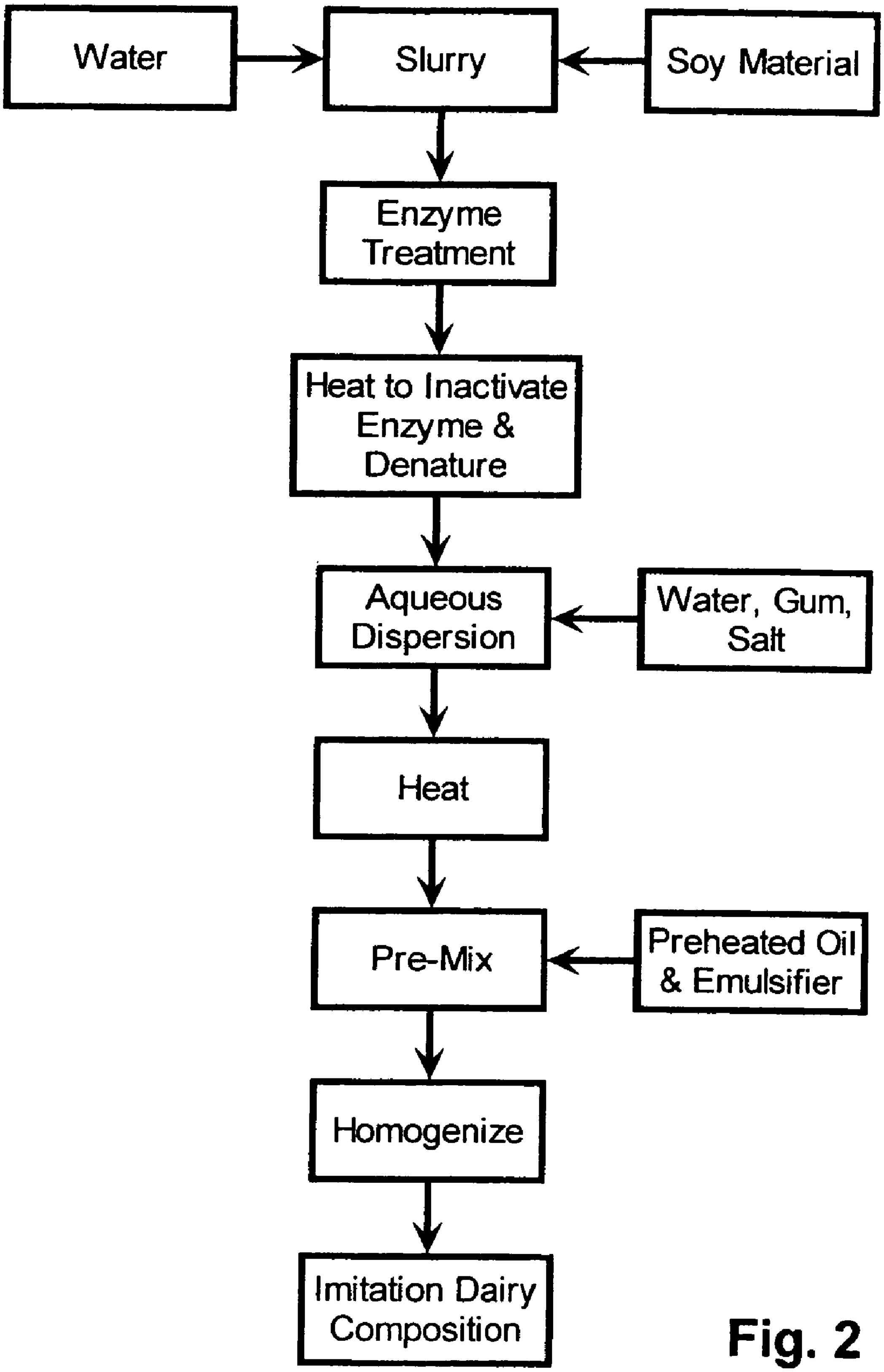
FIG. 2 is a flow chart generally illustrating the preparation of a soy protein-containing dip using the method of this invention whereby the proteins and carbohydrates are denatured using enzymes followed by heat treatment.

Soy flour generally contains about 50 percent protein and about 30 percent carbohydrate. During the pre-treatment phase (such as the initial heating step as illustrated in FIG. 1 or the enzyme treatment step as illustrated in FIG. 2) of the present invention, the carbohydrate component of the soy flour denatures and tends to gel. Likewise, the protein component also denatures or unfolds and increases its emulsifying activity during this pre-treatment phase. Differential scanning calorimetry (DSC) shows that both the protein and the carbohydrate components in soy flour denature or unfold upon the heating pretreatment step. The gelatinized carbohydrate components also form a firm gel network with the proteins in the continuous phase after homogenization and cooling during the process. Because of the enhancement of emulsifying and gelling activities of both the protein and carbohydrate components in the treated soy flour, less protein and starch are needed in the present compositions as compared to convention products in order to obtain similar emulsion stability and gel firmness. The soy protein-containing dips of the present invention are essentially free of beany or other off-flavors normally associated with soy protein-containing products. As a result, reduced caseinate or non-caseinate soy dips can be made having flavor, texture, and appearance similar to conventional sodium caseinate-based dip products.

FIG. 1 provides a flow chart generally illustrating the preparation of a soy protein-containing protein-containing, imitation dairy composition using the method of this invention whereby the proteins and carbohydrates are denatured using heat treatment. Generally this method comprises (1) heating an aqueous slurry of a soy protein-containing material at a temperature and for a time sufficient to denature a substantial amount of proteins and carbohydrates contained in the soy protein-containing material; (2) blending the heat-treated soy protein-containing material with water, a gum, and salt to form an aqueous dispersion; (3) heating the aqueous dispersion; (4) blending a preheated mixture of an oil and an emulsifier with the heated aqueous slurry to form a pre-mix; and (5) homogenizing the pre-mix to form the soy protein-containing, imitation dairy composition. Preferably the soy protein-containing material is a soy flour having a protein dispersibility index of about 40 to about 75 percent, the temperature of step (1) is about 75 to about 100° C., and the substantial amount of proteins and carbohydrates denatured is at least about 40 percent and at least about 50 percent, respectively. More preferably, the protein dispersibility index is about 50 to about 70 percent and the temperature of step (1) is about 80 to about 85° C. Even more preferably the soy protein-containing, imitation dairy composition is a dip.

FIG. 2 is a flow chart generally illustrating the preparation of a soy protein-containing, imitation dairy composition using the method of this invention whereby the proteins and carbohydrates are denatured using enzymes followed by heat treatment. Generally this method comprises (1) treating an aqueous slurry of a soy protein-containing material with a protease enzyme; (2) heat treating the enzyme-treated soy protein-containing material to inactivate the enzyme and for a time and at a temperature sufficient to denature a substantial amount of proteins and carbohydrates contained in the soy protein-containing material; (3) blending the enzyme-inactivated soy protein-containing material with water, a gum, and salt to form an aqueous dispersion; (4) heating the aqueous dispersion; (5) blending a preheated mixture of an oil and an emulsifier with the heated aqueous slurry to form a pre-mix; and (6) homogenizing the pre-mix to form the soy protein-containing, imitation dairy composition. Preferably the soy protein-containing material is a soy flour having a protein dispersibility index of about 40 to about 75 percent, the enzyme is selected from the group consisting of bacterial proteases, fungal protease, microbial proteases, trypsin, chytrpsin, pepsin, and mixtures thereof, and the substantial amount of proteins and carbohydrates denatured is at least about 40 percent and at least about 50 percent, respectively. More preferably, the protein dispersibility index of the soy flour is about 50 to about 70 percent. Even more preferably, the soy protein-containing, imitation dairy composition is a dip.

EXAMPLES

Example 1

Commercially available soy flours were evaluated for use in the present invention. Soy flours from two manufacturers, Archer Daniels Midland ("ADM"; Decatur, Ill.) and Cargill (Cedar Rapids, Iowa) were used in this evaluation. Three soy flours from ADM (Toasted NUTRISOY™ 063-160, Bakers NUTRISOY™ 063-100, and NUTRISOY™ 7B 063-130) and three from Cargill (Nos. 200/20, 200/70, and 100/190) were tested.

During the dip manufacturing process, it is preferred to have a low or modest viscosity prior to homogenization and acidification but a high viscosity after acidification. Soy flours can be prepared under a variety of conditions; for example, they water washed or solvent/water washed and/or dried at different temperatures and times, thereby resulting in different flavor, color, and functionality, including viscosity. Therefore, evaluation of soy flour from available sources is important for selection of the appropriate soy flour in order to optimally manufacture a dip product. For soy flour to be used in the imitation dairy composition of this invention, it is also ideal that the soy flour has low soy flavor with most indigenous enzymes inactivated and moderate viscosity immediately after heating. Optimally, a soy flour will provide sufficient viscosity after the pH is lowered.

For this evaluation, soy flour was dispersed in water at 20 percent. Viscosity of each sample was measured with Brookfield Viscometer (Model DV-II+, spindle RV2 or RV3). Viscosity change was followed up to 4 hours. The samples were then heated in boiling water bath for 6 minutes. Viscosity was again measured after cooling down to room temperature (RT) and overnight storage in refrigeration. After that, the pH of each sample was adjusted by adding acids (acetic acid, lactic acid, $H_2O$ in 1:2:2 ratio). The viscosity at different pH points was measured by the Viscometer.

Protein dispersibility indexes (PDI) were provided by supplier. PDI provides an estimate of the degree of dispersed protein (AOCS, 1987). PDI is the dispersible protein of a food protein system under the conditions of the standard American Oil Chemical Society test; this test was originally developed originally for soy protein. Also see Hsu and Satter, "Procedure for Measuring the Quality of Heat-Treated Soybeans," *J. Dairy Sci.* 78:1353 (1995). The tested soy flours had the following PDIs:

| Sample | PDI (%) |
|---|---|
| ADM 063-160 | 25 |
| Cargill 200/20 | 20 |
| ADM 063-100 | 60 |
| Cargill 200/70 | 70 |
| ADM 063-130 | 90 |
| Cargill 100/90 | 90 |

ADM 063-100 and Cargill 200/70, with their protein dispersibility index of about 60 to about 70 percent provided the most desirable viscosity characteristics.

Example 2

Heat-treated soy flour was prepared by heating an aqueous slurry containing 17 percent ADM 063-100 soy flour at about 186° F. for 1 min; after the heat treatment, the sample was cooled to about 100° F. and then spray dried. Enzyme-treated soy flour was prepared by treating an aqueous slurry containing 17 percent ADM 063-100 soy flour with 0.10 to 0.20 percent Corolase 7809 and 0.05 to 0.15 percent Corolase PN-L (based on weight of soy flour) (both enzymes available from AB Enzyme (Somerset, N.J.) for 10 to 40 minutes; after treatment, they were heated to about 80 to about 90° C. to inactivate the enzymes and denature the protein and carbohydrates and then cooled to room temperature.

Figure 3:
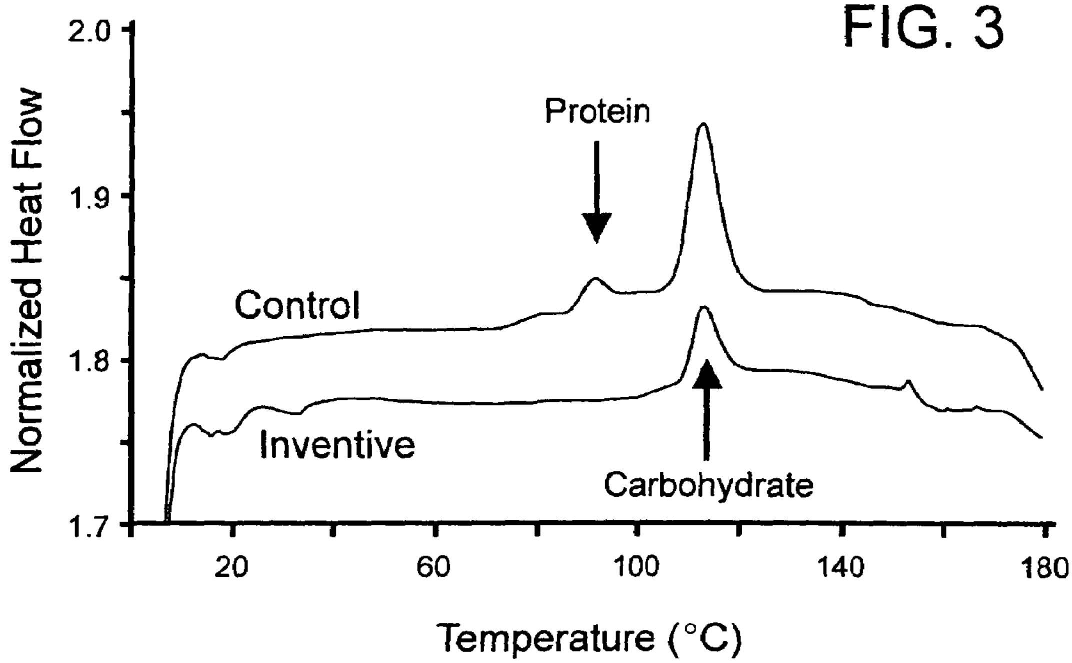
FIG. 3 is a differential scanning calorimetry spectra of untreated and heat-treated soy flour demonstrating the denaturation of soy proteins and carbohydrates in the heat-treated soy flour sample.

Differential scanning calorimetry (DSC) experiments were carried out on these samples as well as control samples. Both the heat-treated and control soy flour powders were re-suspended in water to form 50% pastes which were then subject to DSC to determining the denaturation of protein and carbohydrate by heating the pastes from 0 to 150° C. at 10°/min using a Perkin-Elmer differential scanning calorimeter. The results of the DSC are depicted in FIG. 3. DSC spectra of the control and heat-treated soy flours show that both the protein peak (85 to 90° C.) and the carbohydrate peak (115 to 120° C.) were significantly decreased, indicating that both biopolymers were denatured. Similar denaturing of both biopolymers were also observed with enzyme treatment.

Example 3

Dips were prepared using the treated soy flour as prepared in Example 2 as follows: (1) salt, gum, and the soy flour (treated or untreated controls) were blended and then added to water to make a dispersion, (2) the dispersion was then heated to about 50 to 80° C. and added to coconut/soybean oil blend (preheated to about 50 to 80° C.) and an emulsifier mixture comprising corn syrup powder, sodium caseinate, whey protein concentrate, and starch to make a pre-mix, (3) the pre-mix was heated to about 80 to 90° C., homogenized at about 2000 to 3000 psi, and cooled to about 4 to 10° C. to form the imitation dairy composition, and (4) condiments (e.g., French onion, ranch, green onion, bacon cheddar, or guacamole seasonings or flavorings) which have been cooked at 160 to 190° F., flavors, and acid were mixed with the imitation dairy composition. The final dip product was obtained with thorough mixing in a Hobart Blender. The specify formulations used are presented in the table below. Sodium caseinate was substituted by soy protein in the following proportions: Sample 1:0%, Sample 2:75%, and Sample 3:100%.

| Ingredient | Formula 1 (%) (0% sodium caseinate replacement) | Formula 2 (%) (75% sodium caseinate replacement) | Formula 3 (100% sodium caseinate replacement) |
|---|---|---|---|
| Water | 60 | 60 | 60 |
| Oil Blend | 15 | 15 | 15 |
| Emulsifier | 0.1 | 0.1 | 0.1 |
| Corn Syrup powder | 4.4 | 4.4 | 4.4 |
| Sodium Caseinate | 1.9 | 0.5 | — |
| Treated Soy Flour | — | 1.5 | 2.0–2.5 |
| Salt (NaCl) | 0.2 | 0.2 | 0.2 |
| Whey protein concentrate (WPC) | 4.0 | 4.0 | 4.0 |

-continued

| Ingredient | Formula 1 (%) (0% sodium caseinate replacement) | Formula 2 (%) (75% sodium caseinate replacement) | Formula 3 (100% sodium caseinate replacement) |
|---|---|---|---|
| Starch | 0.6 | 0.6 | 0.6 |
| Gum | 0.2 | 0.2 | 0.2 |
| Other salts | 0.15 | 0.15 | 1.5 |
| Acid | 1.1 | 1.1 | 1.1 |
| Flavor | 0.1–0.15 | 0.1–0.15 | 0.1–0.15 |
| Condiments | 13.2 | 13 | 13 |

* If desired, the whey protein concentrate can also be replaced (partially or wholly) with treated soy flour.

The inventive dip samples were analyzed and compared to both control samples (prepared in the same manner but using untreated soy flour) and commercial dip product. Samples were subjected to ultracentrifugation a 100,000×G for 30 minutes at 25° C. in order to evaluation stability. The stability of the inventive dips was comparable to commercially available dips. In addition, the amount of aqueous phase separation in these samples are very similar, and very little, suggesting that each emulsion's stability against syneresis upon aging is as good as the control.

An informal sensory panel with eight members tasted dip samples made with treated soy flour and compared them with similar conventional dips. No soy flavor was detected in the dip made with treated soy flour. Rather, the dips made with treated soy flour appeared to have even better texture and appearance than the convention dips.

Example 4

Dips similar to those described in Example 3 were prepared wherein the treatment of the soy flour was incorporated into the dip manufacturing process. A pilot plant process was used to prepare various French onion dips as follows: Melt oil blend. Heat oil, corn syrup powder, sodium caseinate, whey protein concentrate, and starch to about 50 to about 80° C. Blend gum, salt, and soy flour with hot water. Add powder slurry to oil-emulsifier mix heated above, and mix. Heat the mixture with steam injection to about 70 to about 90° C. to effect heat treatment of soy flour. Homogenize the mixture at 2000 to 3000 psi pressure. Cool the homogenized mixture to about 4 to about 10° C. Add acid and flavor. Add condiments, flavorings or species (preferably cooked at about 70 to 90° C.). Package at about 10 to about 30° C. Store at refrigerated temperatures.

The following formulations having various levels of sodium caseinate replacement with treated soy flour were prepared and analyzed.

Formulas of plant trial control and soy French onion Dips:

| Ingredient | Control | T1 (67% caseinate replacement) | T2 (55% caseinate replacement) | T3 (61% caseinate replacement) |
|---|---|---|---|---|
| Water | 59.36 | 59.29 | 59.26 | 59.26 |
| Oil blend | 14.6 | 14.6 | 14.6 | 14.6 |
| Corn syrup powder | 4.42 | 4.72 | 4.93 | 4.83 |
| Sodium caseinate | 1.92 | 0.64 | 0.86 | 0.75 |
| Treated Soy flour | 0 | 1.26 | 0.86 | 1.07 |
| WPC* | 3.97 | 3.97 | 3.97 | 3.97 |
| Starch | 0.64 | 0.34 | 0.34 | 0.34 |
| Salt | 0.21 | 0.21 | 0.21 | 0.21 |

-continued

Formulas of plant trial control and soy French onion Dips:

| Ingredient | Control | T1 (67% caseinate replacement) | T2 (55% caseinate replacement) | T3 (61% caseinate replacement) |
|---|---|---|---|---|
| Emulsifier | 0.13 | 0.13 | 0.13 | 0.13 |
| Gum | 0.21 | 0.26 | 0.26 | 0.26 |
| Other salts | 0.15 | 0.15 | 0.15 | 0.15 |
| Acids | 1.1 | 1.1 | 1.1 | 1.1 |
| Flavor | 0.09 | 0.13 | 0.13 | 0.13 |
| Condiments | 13.2 | 13.2 | 13.2 | 13.2 |

*If desired, the whey protein concentrate can also be replaced (partially or wholly) with treated soy flour.

The soy flour-based and control French onion dips were subjected to ultracentrifugation at 100,000×g for 30 minutes at 25° C. to determine stability of the emulsions. None of these soy-based and control dips under went oil separation at 100,000 times gravity, indicating these emulsions are stable. In addition, the amount of aqueous phase separation in these samples are very similar, and are very little, suggesting that each emulsion's stability against syneresis upon aging is as good as the control.

The rheology and emulsion stability of the soy flour-based and control French onion dips were determined by yield stress, particle size, and conductivity measurements. The yield stress values showed that these soy flour-based French onion dips have essentially the same texture as the control. The particle size analysis, ultracentrifugation, and conductivity measurements showed that these soy flour-based French onion dips have essentially the same emulsion stability as the control. Based on the two-month shelf-life study results, little difference in yield stress values, emulsion drop sizes, and stability against creaming and phase separation was obtained, suggesting that these soy flour-based French onion dips are as stable as the control over their shelf lives.

We claim:

1. An imitation dairy composition comprising, corn syrup powder, a gum, water, oil treated soy protein product, and at least one protein emulsifier wherein the treated soy protein product is obtained by treatment of a soy protein-containing material in order to denature at least about 40 percent of the proteins and at least about 50 percent of the carbohydrates contained in the soy protein-containing material.

2. The imitation dairy composition as defined in claim 1, wherein the soy protein-containing material is a soy flour.

3. The imitation dairy composition as defined in claim 1, wherein the treatment comprises heating an aqueous slurry of the soy protein-containing material to a temperature of about 75 to about 100° C.

4. The imitation dairy composition as defined in claim 2, wherein the treatment comprises heating an aqueous slurry of the soy protein-containing material to a temperature of about 75 to about 100° C.

5. The imitation dairy composition as defined in claim 1, wherein the treatment comprises treating an aqueous slurry of the soy protein-containing material with a protease enzyme and then heat treating the enzyme-treated soy protein-containing material to inactivate the enzyme.

6. The imitation dairy composition as defined in claim 2, wherein the treatment comprises treating an aqueous slurry of the soy protein-containing material with a protease enzyme and then heat treating the enzyme-treated soy protein-containing material to inactivate the enzyme.

7. The imitation dairy composition as defined in claim 2, wherein the soy flour has a protein dispersibility index of about 40 to about 75 percent.

8. The imitation dairy composition as defined in claim 4, wherein the soy flour has a protein dispersibility index of about 40 to about 75 percent.

9. The imitation dairy composition as defined in claim 3, wherein the soy flour has a protein dispersibility index of about 40 to about 75 percent.

10. The imitation dairy composition as defined in claim 7, wherein the soy flour has a protein dispersibility index of about 50 to about 70 percent.

11. The imitation dairy composition as defined in claim 8, wherein the soy flour has a protein dispersibility index of about 50 to about 70 percent.

12. The imitation dairy composition as defined in claim 9, wherein the soy flour has a protein dispersibility index of about 50 to about 70 percent.

* * * * *

UNITED STATES PATENT AND TRADEMARK OFFICE
CERTIFICATE OF CORRECTION

PATENT NO. : 6,984,409 B2
DATED : January 10, 2006
INVENTOR(S) : Gao et al.

It is certified that error appears in the above-identified patent and that said Letters Patent is hereby corrected as shown below:

Title page,
Item [75], Inventors, change "Glenview, IL" to -- Lansdale, PA --; and "Veronic M. Harrison" to -- Veronica M. Harrison --.

Column 9,
Line 41, after "oil" insert -- , --.

Signed and Sealed this

Thirteenth Day of June, 2006

JON W. DUDAS
*Director of the United States Patent and Trademark Office*